United States Patent
Mori et al.

(10) Patent No.: US 10,140,460 B2
(45) Date of Patent: Nov. 27, 2018

(54) FILE STORAGE SYSTEM AND USER TERMINAL

(71) Applicant: MITSUBISHI ELECTRIC CORPORATION, Tokyo (JP)

(72) Inventors: Takumi Mori, Tokyo (JP); Sachihiro Ichikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 15/033,855

(22) PCT Filed: Dec. 11, 2013

(86) PCT No.: PCT/JP2013/083177
§ 371 (c)(1),
(2) Date: May 2, 2016

(87) PCT Pub. No.: WO2015/087407
PCT Pub. Date: Jun. 18, 2015

(65) Prior Publication Data
US 2016/0253517 A1    Sep. 1, 2016

(51) Int. Cl.
*H04L 29/06* (2006.01)
*G06F 21/62* (2013.01)
(Continued)

(52) U.S. Cl.
CPC ........ *G06F 21/6218* (2013.01); *G06F 3/0486* (2013.01); *G09C 1/00* (2013.01); *H04L 9/14* (2013.01); *G06F 2221/2107* (2013.01)

(58) Field of Classification Search
USPC ....................................................... 713/165
See application file for complete search history.

(56) References Cited

U.S. PATENT DOCUMENTS 8,615,668 B2    12/2013    Matsuda et al.
9,237,013 B2     1/2016    Ichikawa et al.
(Continued)

FOREIGN PATENT DOCUMENTS

CN    103152322 A    6/2013
CN    103179114 A    6/2013
(Continued)

OTHER PUBLICATIONS

Goto et al., "A File Sharing Service with File Name Encryption using CP-ABE", 2012 Information Processing Society of Japan, pp. 211-216.
(Continued)

*Primary Examiner* — Jeffrey C Pwu
*Assistant Examiner* — Samuel Ambaye
(74) *Attorney, Agent, or Firm* — Birch, Stewart, Kolasch & Birch, LLP

(57) ABSTRACT

A data storage system (1) uses an encryption scheme in which an encrypted file can be decrypted using a decryption key when a decryption condition set in the encrypted file is satisfied by a user attribute set in the decryption key. The data storage system (1) stores encrypted files encrypted by the encryption scheme in a file storage apparatus (20). When user attribute is specified from a user terminal (10), the data storage system (1) extracts the encrypted file of which the decryption condition is satisfied by the specified user attribute from among the encrypted files stored in the file storage apparatus (20), and displays the extracted encrypted files classified by decryption condition.

10 Claims, 13 Drawing Sheets

(51) Int. Cl.
*G09C 1/00* (2006.01)
*H04L 9/14* (2006.01)
*G06F 3/0486* (2013.01)

(56) References Cited

U.S. PATENT DOCUMENTS

| | | | |
|---|---|---|---|
| 2007/0177740 A1* | 8/2007 | Nakajima | G06F 21/6218 380/277 |
| 2012/0297201 A1 | 11/2012 | Matsuda et al. | |
| 2012/0300936 A1* | 11/2012 | Green | H04L 9/3073 380/278 |
| 2014/0310521 A1 | 10/2014 | Ichikawa et al. | |

FOREIGN PATENT DOCUMENTS

| | | |
|---|---|---|
| JP | 2005-31862 A | 2/2005 |
| JP | 2008-250369 A | 10/2008 |
| JP | 2010-244432 A | 10/2010 |
| JP | 2011-27917 A | 2/2011 |
| JP | 2011-216034 A | 10/2011 |
| JP | 5102798 B2 | 12/2012 |
| WO | WO 2011/086687 A1 | 7/2011 |
| WO | WO 2013/094018 A1 | 6/2013 |

OTHER PUBLICATIONS

Goto et al., "Implementation and Evaluation of a File Sharing Service with File Name Encryption using CP-ABE", IEICE Technical Report, 2012, pp. 49-54.

Okamoto et al., "Fully Secure Functional Encryption with General Relations from the Decisional Linear Assumption", pp. 1-18.

Office Action dated May 23, 2018 received in copending European Application No. 13 898 923.1.

* cited by examiner

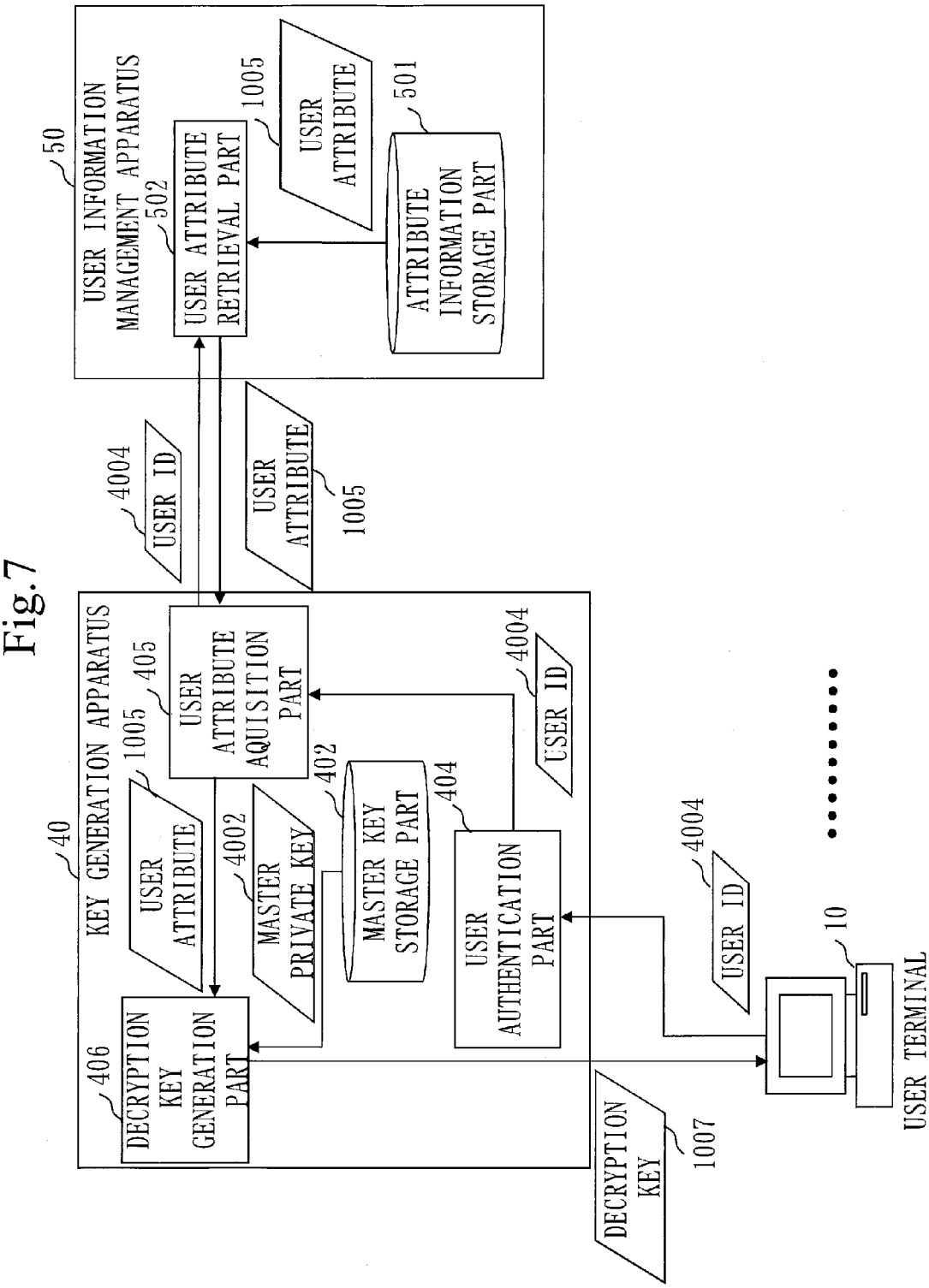

Fig. 8

| ATTRIBUTE TYPE | ATTRIBUTE VALUE |
|---|---|
| DEPARTMENT | ACCOUNTING DEPARTMENT, PERSONNEL DEPARTMENT |
| DIVISION | ACCOUNTING DIVISION, BUDGET DIVISION |
| OFFICIAL POSITION | DEPARTMENT MANAGER, DIVISION MANAGER, PERSON IN CHARGE |

Fig. 9

| USER NAME | USER ATTRIBUTE |
|---|---|
| KENICHI SUZUKI | NAME=KENICHI SUZUKI, DEPARTMENT=ACCOUNTING DEPARTMENT, DIVISION=NULL, OFFICIAL POSITION=DEPARTMENT MANAGER |
| TETSUYA SATO | NAME=TETSUYA SATO, DEPARTMENT=ACCOUNTING DEPARTMENT, DIVISION=BUDGET DIVISION, OFFICIAL POSITION=DIVISION MANAGER |
| TOMOKO KOBAYASHI | NAME=TOMOKO KOBAYASHI, DEPARTMENT=ACCOUNTING DEPARTMENT, DIVISION=BUDGET DIVISION, OFFICIAL POSITION=PERSON IN CHARGE |

| USER ID | USER NAME | DEPARTMENT | DIVISION | OFFICIAL POSITION |
|---|---|---|---|---|
| KS1001 | KENICHI SUZUKI | ACCOUNTING DEPARTMENT | NULL | DEPARTMENT MANAGER |
| TS1002 | TETSUYA SATO | ACCOUNTING DEPARTMENT | BUDGET DIVISION | DIVISION MANAGER |
| TK1003 | TOMOKO KOBAYASHI | ACCOUNTING DEPARTMENT | BUDGET DIVISION | PERSON IN CHARGE |
| HT2001 | HIROSHI TAKAHASHI | PERSONNEL DEPARTMENT | NULL | DEPARTMENT MANAGER |

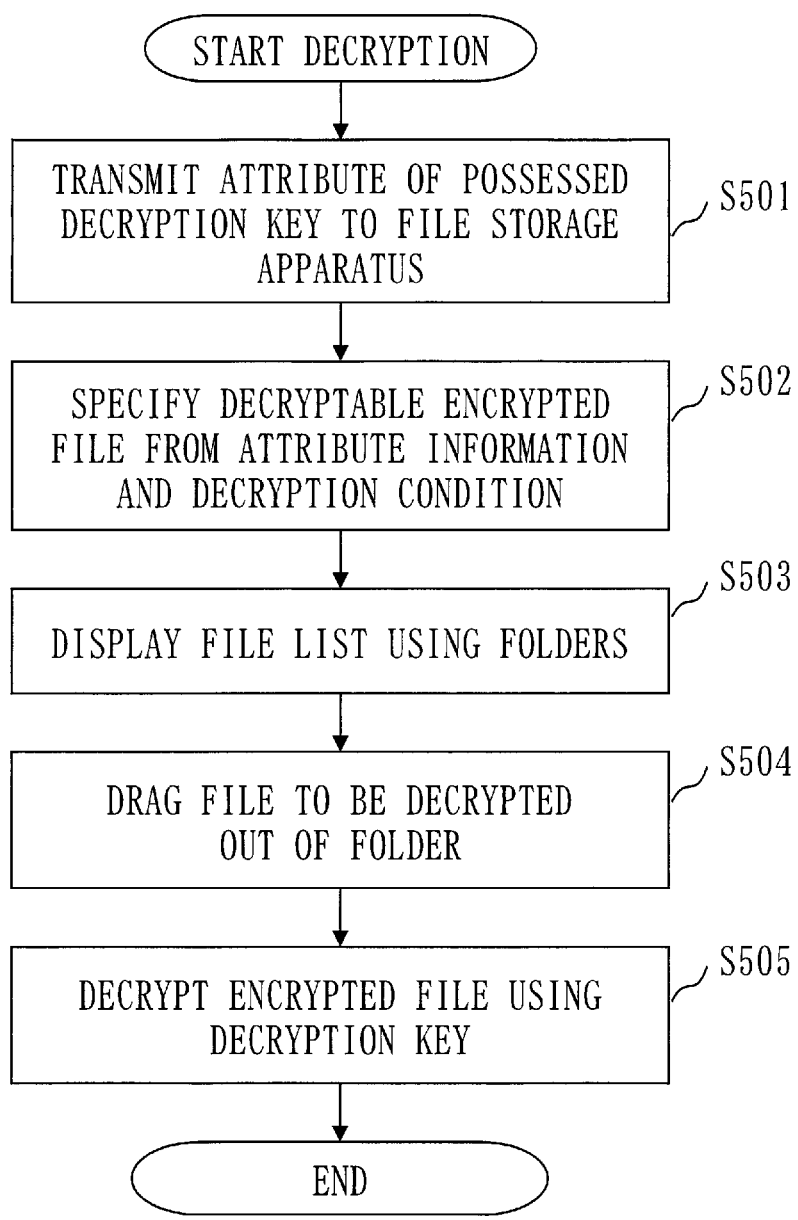

Fig.16

| |
|---|
| DEPARTMENT=ACCOUNTING DEPARTMENT AND (OFFICIAL POSITION=DEPARTMENT MANAGER OR OFFICIAL POSITION=DIVISION MANAGER) ¥BUDGET OF 2013 FISCAL YEAR.xls |
| DEPARTMENT=ACCOUNTING DEPARTMENT AND (OFFICIAL POSITION=DEPARTMENT MANAGER OR OFFICIAL POSITION=DIVISION MANAGER) ¥ACCOUNTING PLAN OF 2014 FISCAL YEAR.doc |
| DEPARTMENT=ACCOUNTING DEPARTMENT OR DEPARTMENT=PERSONNEL DEPARTMENT ¥ANNOUNCEMENT OF TRAINING.doc |

Fig. 17

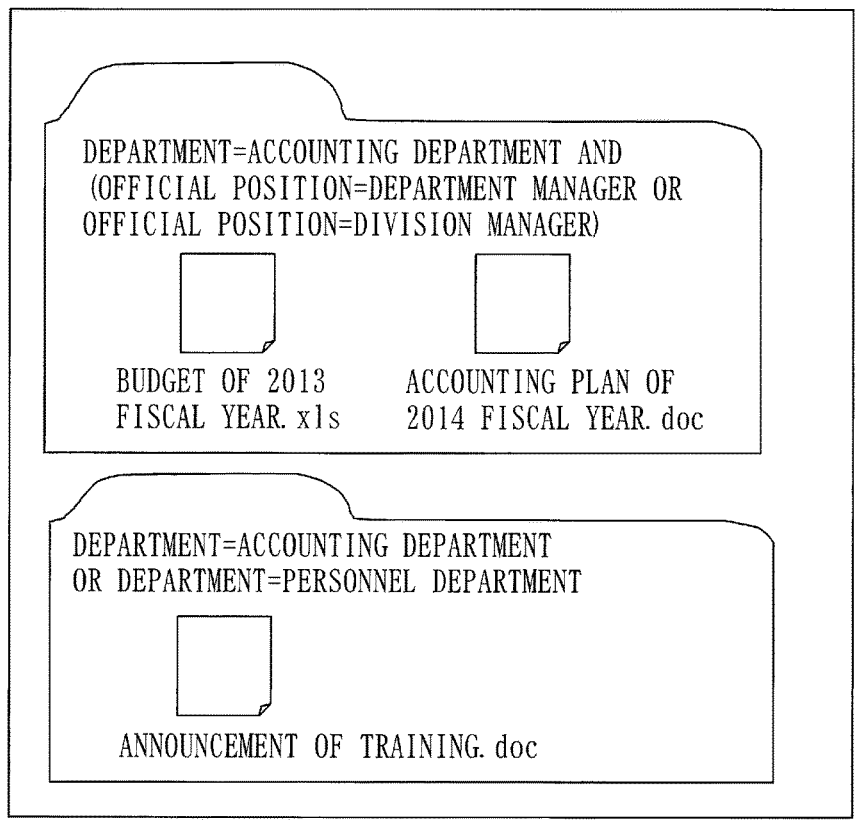

FILE STORAGE SYSTEM AND USER TERMINAL

TECHNICAL FIELD

The present invention relates to technique to encrypt and to store files.

BACKGROUND ART

In recent years, there are cases where an electronic data file (simply referred to as a file, hereinafter) is stored in a file server on the Internet, and accessed from various devices (for instance, a notebook PC, a tablet-like device, a smartphone).

While the convenience of such a usage of files is high, on the other hand, there is a risk that the file may be browsed by an unintentional third party. Therefore, in a case of handling the file with high confidentiality, it is essential to take operation to secure the confidentiality using information security technology such as encryption and access restriction.

In a conventional file server, a manager manages folder configuration and also manages an access right for each folder (or each file). In addition, in a case where a file with high confidentiality is stored in the file server, after encrypting by a client, the file is transmitted to the file server, and the encrypted file is stored in the file server.

This operation prevents the file with high confidentiality from being browsed by the unintentional third party.

Patent Literatures 1 to 3 describe technique to store a confidential file in the file server. Patent Literatures 1 to 3 describe that an access right is managed for each folder and that files are encrypted and stored.

CITATION LIST

Patent Literature

Patent Literature 1: JP2005-031862A
Patent Literature 2: JP2010-244432A
Patent Literature 3: JP2011-216034A

Non-Patent Literature

Non-Patent Literature 1: Tatsuaki Okamoto, Katsuyuki Takashima, "Fully Secure Functional Encryption with General Relations from the Decisional Linear Assumption", Advances in Cryptology—CRYPTO 2010, pp. 191-208

SUMMARY OF INVENTION

Technical Problem

In a case where a manager of the file server manages the access right for each folder, it is necessary to manage the users, the folders, the access rights, and the like by providing a user authentication server, an access control server, and the like. Therefore, in accordance with the increase of the number of users or files, the information quantity to be managed is increased, and the operation is loaded.

Further, in a case where the file is encrypted and stored, it is necessary to change an encryption key and a decryption key for each user who wants to decrypt the file. Then, it is necessary to distribute a decryption key being necessary for decryption to each user beforehand. Therefore, in accordance with the increase of the number of files, the quantity of keys to be managed is increased, and the operation is loaded.

The present invention aims to decrease the operational load such as managing the access rights or the keys without damaging the usability of the conventional file server.

Solution to Problem

According to the present invention, a file storage system has a file storage apparatus to store a ciphertext of data encrypted by an encryption scheme in which a ciphertext can be decrypted using a decryption key when attribute information set in the decryption key satisfies a decryption condition set in the ciphertext and a user terminal to access the file storage apparatus, the user terminal includes:
an attribute information transmission part to transmit the attribute information to the file storage apparatus,
the file storage apparatus includes:
a ciphertext storage part to store ciphertexts;
a ciphertext extraction part to extract identifying information of a ciphertext of which a decryption condition is satisfied by the attribute information transmitted by the attribute information transmission part from among the ciphertexts stored by the ciphertext storage part; and
a list transmission part to transmit a list indicating identifying information of the ciphertext extracted by the ciphertext extraction part to the user terminal, and
the user terminal further includes:
a list display part to display the identifying information, indicated by the list transmitted by the list transmission part, classified by decryption condition.

Advantageous Effects of Invention

In a file storage system related to the present invention, the encryption scheme in which a ciphertext can be decrypted by a decryption key when decryption condition set in the ciphertext is satisfied by attribute information set in the decryption key is used. This operation eliminates management of the access right and the number of keys to be managed may be decreased.

Further, in the file storage system related to the present invention, a list of ciphertexts, of which the decryption condition is satisfied by the attribute information transmitted from the user terminal, is classified by decryption condition and displayed. By this operation, management of the folders is unnecessary. Further, the files classified are displayed similarly to the conventional file server, and the usability would not be damaged.

BRIEF DESCRIPTION OF DRAWINGS

FIG. 7 is a functional block diagram illustrating a function of a key generation apparatus 40 and a user information management apparatus 50 related to the first embodiment.

FIG. 8 is a list of attribute types and attribute values used for expression of user attribute 1005 assumed in the first embodiment.

FIG. 9 is a list of users assumed in the first embodiment.

FIG. 15 is a flowchart illustrating a decryption process related to the first embodiment.

FIG. 16 is a diagram illustrating an example of a file list 1006 related to the first embodiment.

FIG. 17 is a diagram illustrating a display example of a file list 1006 related to the first embodiment.

DESCRIPTION OF EMBODIMENTS

Embodiment 1

The first embodiment will explain, in a client server model, a storage method (encryption method) for storing a file by a client (user terminal) in a server (file server) connected to the network and a use method (decryption method) of the stored encrypted file.

In the first embodiment, a functional encryption (refer to Non-Patent Literature 1, for instance) is used for an encryption scheme.

The functional encryption is a kind of a public key encryption. Different from an RSA ciphering which is popularly used at present, the functional encryption is an encryption, in which when a predetermined relation is established between parameters which have been set at the time of encrypting the file and parameters set in the decryption key, the encrypted file can be decrypted by the decryption key.

For instance, at the time of encrypting the file, a logical expression such as "department=general affairs department AND division=personnel division" is set as a parameter, and in the decryption key, attribute information of "department=general affairs department, division=accounting division" is set for a parameter. Then, only when the relation between the logical expression set at the time of encrypting and the attribute information set in the decryption key is true, the encrypted file can be decrypted by the decryption key.

That is, in the functional encryption, if the decryption condition set in the ciphertext is satisfied by the attribute information set in the decryption key, the ciphertext is decryptable by the decryption key.

Here, the encryption scheme other than the functional encryption may be used as long as it is an encryption scheme by which when the decryption condition set in the ciphertext is satisfied by the attribute information set in the decryption key, the ciphertext is decryptable by the decryption key.

Figure 1:
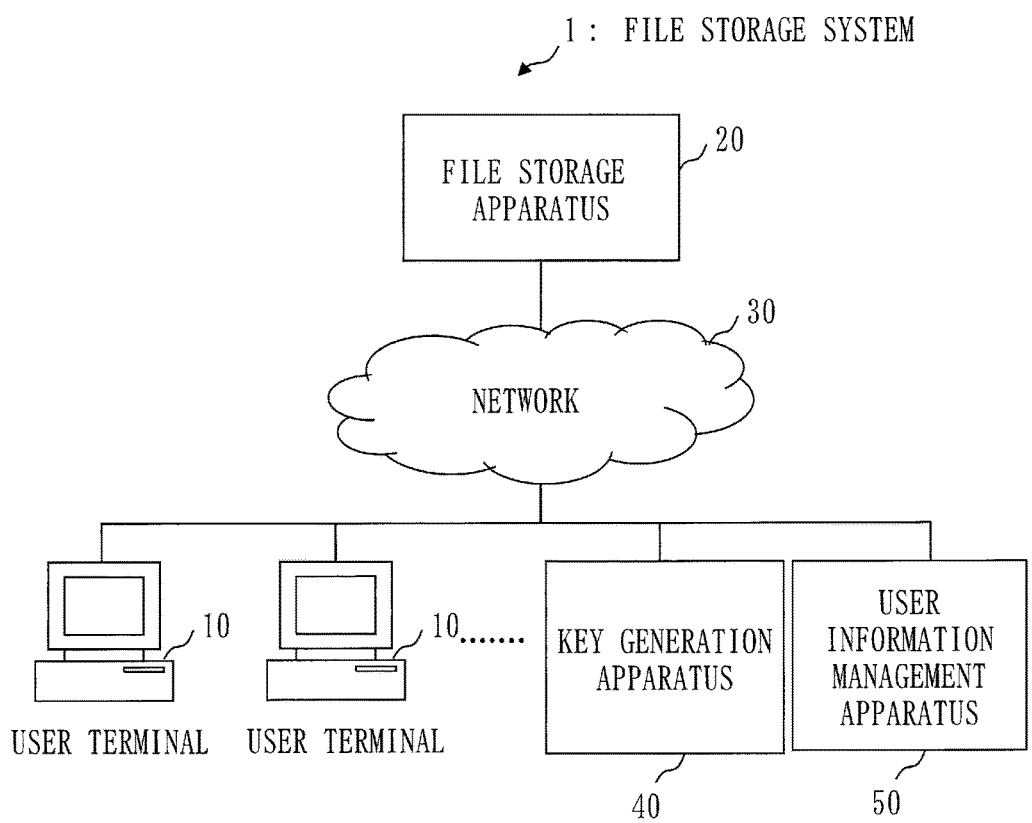
FIG. 1 is a configuration diagram illustrating a file storage system 1 related to a first embodiment.

FIG. 1 is a configuration diagram illustrating a file storage system 1 related to the first embodiment.

In the file storage system 1, one or more user terminals 10 and a file storage apparatus 20 are connected via a network 30.

Further, a key generation apparatus 40 and a user information management apparatus 50 are connected to the user terminal 10 via the network 30. The key generation apparatus 40 and the user information management apparatus 50 are configured so as not to be accessed from the file storage apparatus 20 side (the Internet side, for instance) of the network 30.

The user terminal 10 is a device including a communication function. The user terminal 10 is, for instance, a desktop PC, a notebook PC, a smartphone, a tablet terminal, and the like.

The file storage apparatus 20 is a commonly-used file server. The file storage apparatus 20 may be configured by a plurality of computers.

The network 30 is, for instance, the Internet or a network structured by dedicated lines.

The key generation apparatus 40 is a server to manage an encryption key. The key generation apparatus 40 may be configured by a plurality of computers. The key generation apparatus 40 manages the encryption key and the like in secrecy by encryption, access control, and the like.

The user information management apparatus 50 is a directory server to manage organization information. The user information management apparatus 50 is, for instance, a directory server such as an LDAP (LIGHTWEIGHT Directory Access Protocol) or an AD (Active Directory) of Microsoft company.

In general, the key generation apparatus 40 and the user information management apparatus 50 are strictly managed in an organization, and thus, in many cases, the key generation apparatus 40 and the user information management apparatus 50 are not connected to the public network such as the Internet. However, after implementing sufficient information security countermeasures, the key generation apparatus 40 and the user information management apparatus 50 may be configured so as to be accessed from the Internet.

Figure 2:
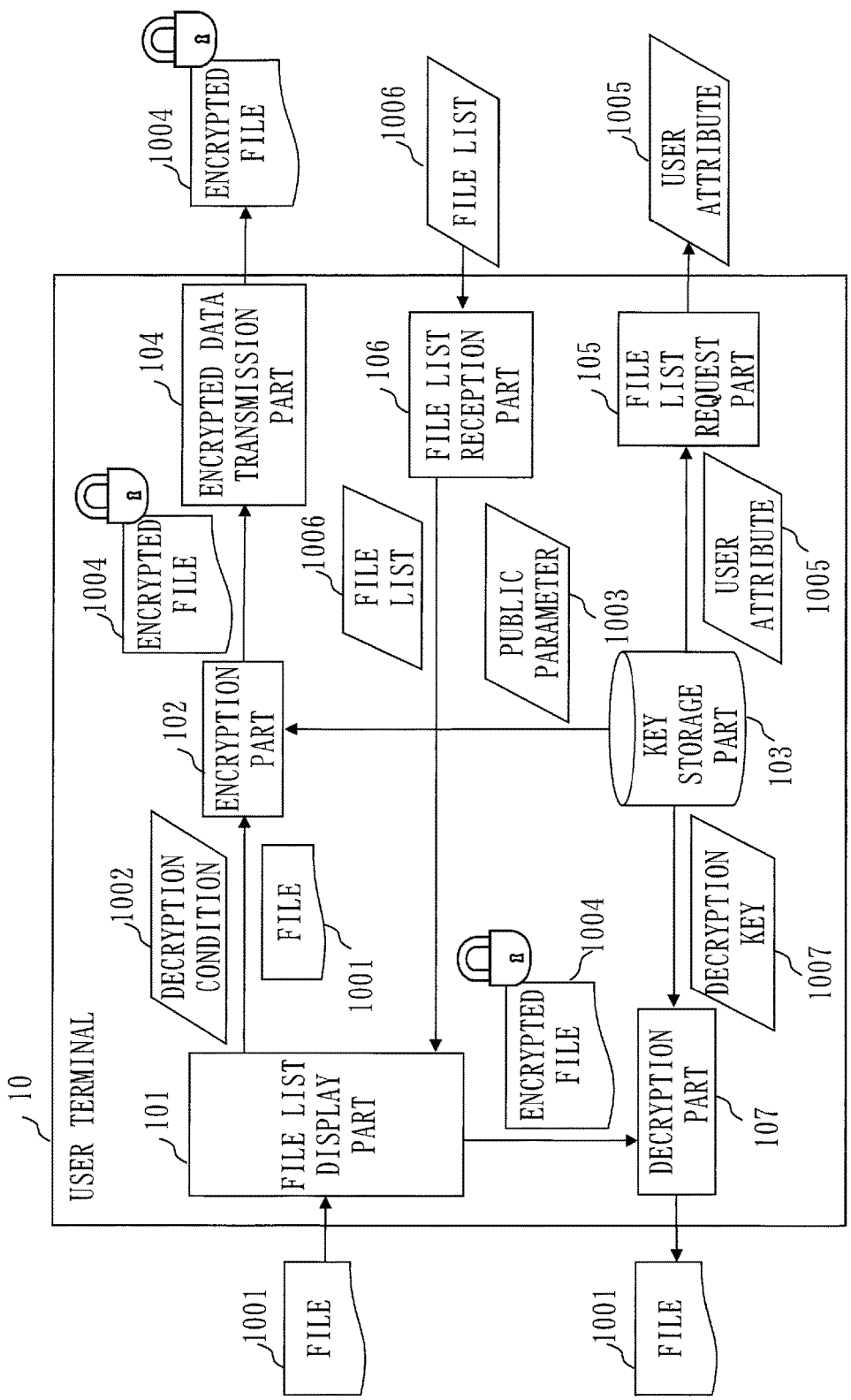
FIG. 2 is a functional block diagram illustrating a function of a user terminal 10 related to the first embodiment.

FIG. 2 is a functional block diagram illustrating a function of a user terminal 10 related to the first embodiment.

The user terminal 10 includes a file list display part 101 (list display part), an encryption part 102, a key storage part 103, an encrypted data transmission part 104, a file list request part 105 (attribute information transmission part), a file list reception part 106 (list reception part), and a decryption part 107.

A file 1001 is an electronic data file which is a target to be encrypted and to be stored using the file storage system 1. The file 1001 may be a so-called electronic data file; the file 1001 is, for instance, a document file, a voice file, and a video file.

A decryption condition 1002 is data indicating a user of which user terminal 10 can browse the file 1001. The decryption condition 1002 is expressed in a form of a logical expression; the decryption condition 1002 is expressed by a combination of, for instance, [attribute type]=[attribute value] such as "department=accounting department AND division=budget division", operators that connect them and "parentheses "( )"" indicating a priority degree of evaluation of the logical expressions. The operator includes, for instance, "AND" indicating a logical product, "OR" indicating a logical sum, "NOT" indicating a negation, and the like.

A public parameter 1003 is only one public key (encryption key) of the public key encryption, which exists in the file storage system 1. Being not information to be confidential, the public parameter 1003 is stored in an arbitrary place (for instance, a PC, an external storage, or a server connected to the Internet that configure the file storage system 1) and can be arbitrarily acquired.

An encrypted file 1004 (ciphertext) is the file 1001 which is encrypted using the public parameter 1003 and the decryption condition 1002.

Figure 3:
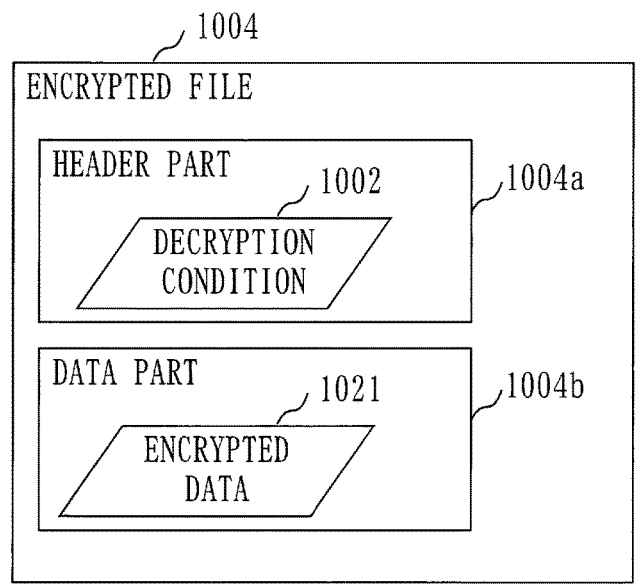
FIG. 3 is a configuration diagram of an encrypted file 1004 related to the first embodiment.

As illustrated in FIG. 3, the encrypted file 1004 includes a header part 1004a and a data part 1004b. The header part 1004a stores the decryption condition 1002 that is indicated at the time of encrypting. The data part 1004b stores the encrypted file 1001 (encrypted data 1021).

User attribute 1005 is attribute information which is linked to the user terminal 10. The user attribute 1005 is expressed by, for instance, in the company, a department to which the user belongs, a division to which the user belongs, a name, an employee ID, and the like.

A file list 1006 is a list of the encrypted files 1004, in which a specific user attribute 1005 is matched to the decryption condition 1002 (namely, being decryptable) set in the encrypted file 1004, from among the encrypted files 1004 stored in the file storage apparatus 20.

The expression format of the file list 1006 is, for instance, a file path format by setting the decryption condition 1002 stored in the header part 1004a of the encrypted file 1004 as a folder name such as "[decryption condition]¥[file name]".

A decryption key 1007 is a key to decrypt the encrypted file 1004 which is linked to the user. In the decryption key 1007, the user attribute 1005 is embedded. The decryption key 1007 can decrypt the encrypted file 1004 if the embedded user attribute 1005 matches the decryption condition 1002 set in the encrypted file 1004.

The file list display part 101 displays the contents of the file list 1006.

Figure 4:
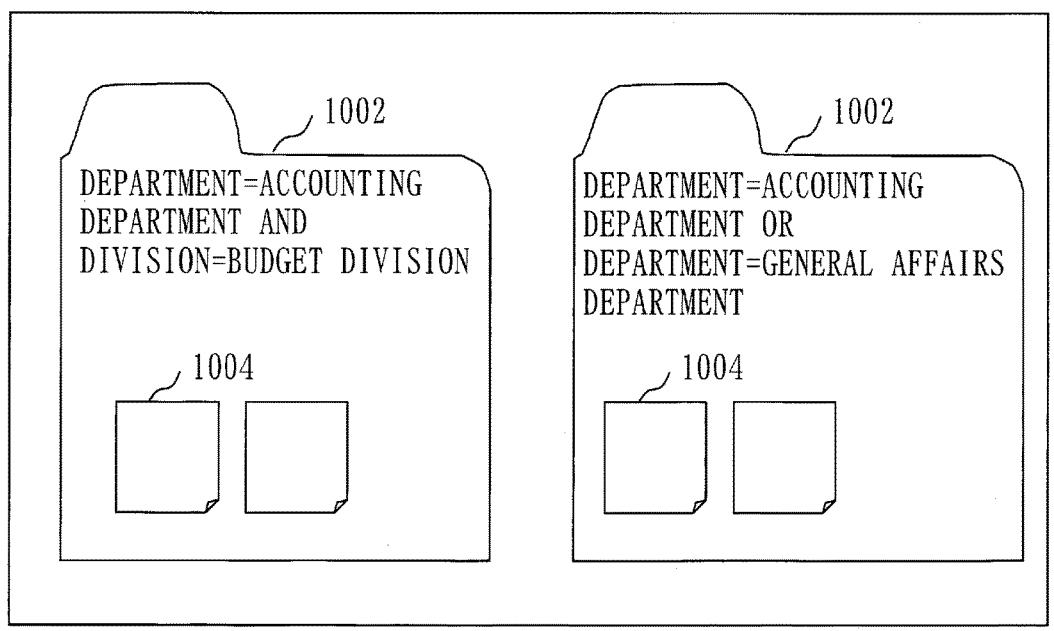
FIG. 4 is a diagram illustrating a display format of a file list 1006 related to the first embodiment.

As illustrated in FIG. 4, the file list display part 101 displays the contents of the file list 1006 by, for instance, a folder structure. A label indicating the decryption condition 1002 is displayed on a folder icon, and file icons indicating the encrypted files 1004 are displayed in the folder icon.

Receiving the file 1001, the public parameter 1003, and the decryption condition 1002 as inputs, the encryption part 102 encrypts the file 1001 using the decryption condition 1002 as a parameter.

The key storage part 103 stores the user attribute 1005, the decryption key 1007, and the public parameter 1003 which are linked to the user terminal 10.

The encrypted data transmission part 104 transmits the encrypted file 1004 to the file storage apparatus 20.

Extracting from the key storage part 103, the file list request part 105 transmits the user attribute 1005 to the file storage apparatus 20 and requests the file list 1006.

The file list reception part 106 receives, in response to the user attribute 1005 transmitted by the file list request part 105, the file list 1006 returned from the file storage apparatus 20.

The decryption part 107 extracts the decryption key 1007 stored by the key storage part 103, and decrypts the encrypted file 1004 using the decryption key 1007 to restore to the file 1001.

Figure 5:
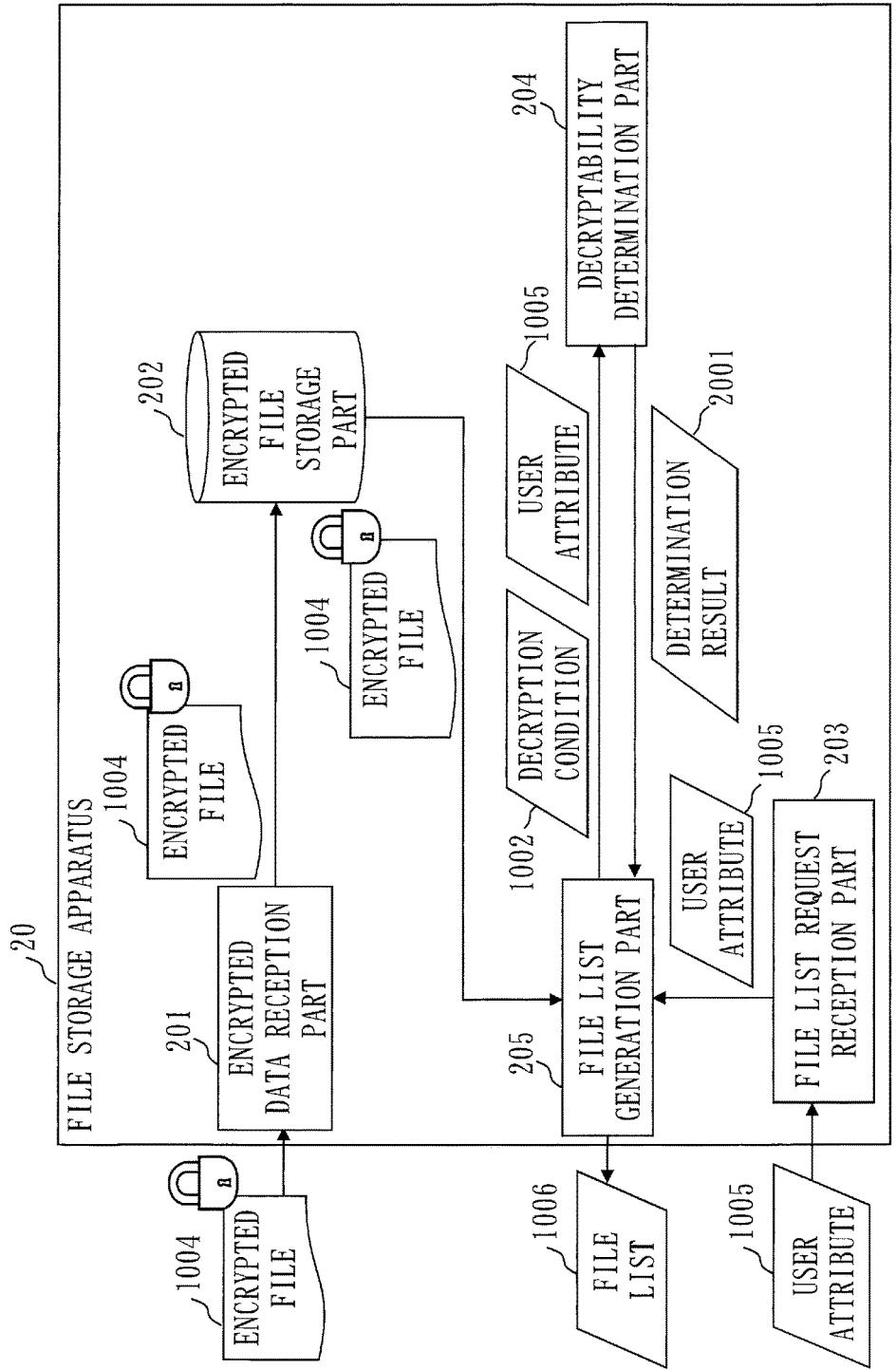
FIG. 5 is a functional block diagram illustrating a function of a file storage apparatus 20 related to the first embodiment.

FIG. 5 is a functional block diagram illustrating a function of the file storage apparatus 20 related to the first embodiment.

The file storage apparatus 20 includes an encrypted data reception part 201, an encrypted file storage part 202 (ciphertext storage part), a file list request reception part 203 (attribute information reception part), a decryptability determination part 204 (ciphertext extraction part), and a file list generation part 205 (list generation part, list transmission part).

The encrypted data reception part 201 receives the encrypted file 1004 from the user terminal 10.

The encrypted file storage part 202 stores one or more encrypted files 1004 received by the encrypted data reception part 201. Here, the encrypted file storage part 202 may store the encrypted files 1004 without classifying (without separating to folders).

The file list request reception part 203 receives the user attribute 1005 from the user terminal 10 as a request of the file list 1006.

The decryptability determination part 204 determines, from the decryption condition 1002 and the user attribute 1005, if the user attribute 1005 matches the decryption condition 1002, and returns determination result 2001 to the file list generation part 205.

The determination result 2001 is data indicating one of true and false (TRUE/FALSE).

The file list generation part 205 generates the file list 1006 based on the user attribute 1005 received by the file list request reception part 203.

The file list generation part 205 extracts the encrypted file 1004 stored by the encrypted file storage part 202, and further extracts the decryption condition 1002 from the header part 1004a of the encrypted file 1004. The file list generation part 205 transfers the extracted decryption condition 1002 and the user attribute 1005 received from the file list request reception part 203 to the decryptability determination part 204, and acquires the determination result 2001. The file list generation part 205 carries out this operation on all of the encrypted files 1004 stored in the encrypted file storage part 202, and returns a list of the encrypted files 1004 of which the determination result 2001 is TRUE to the user terminal 10 as the file list 1006.

Figure 6:
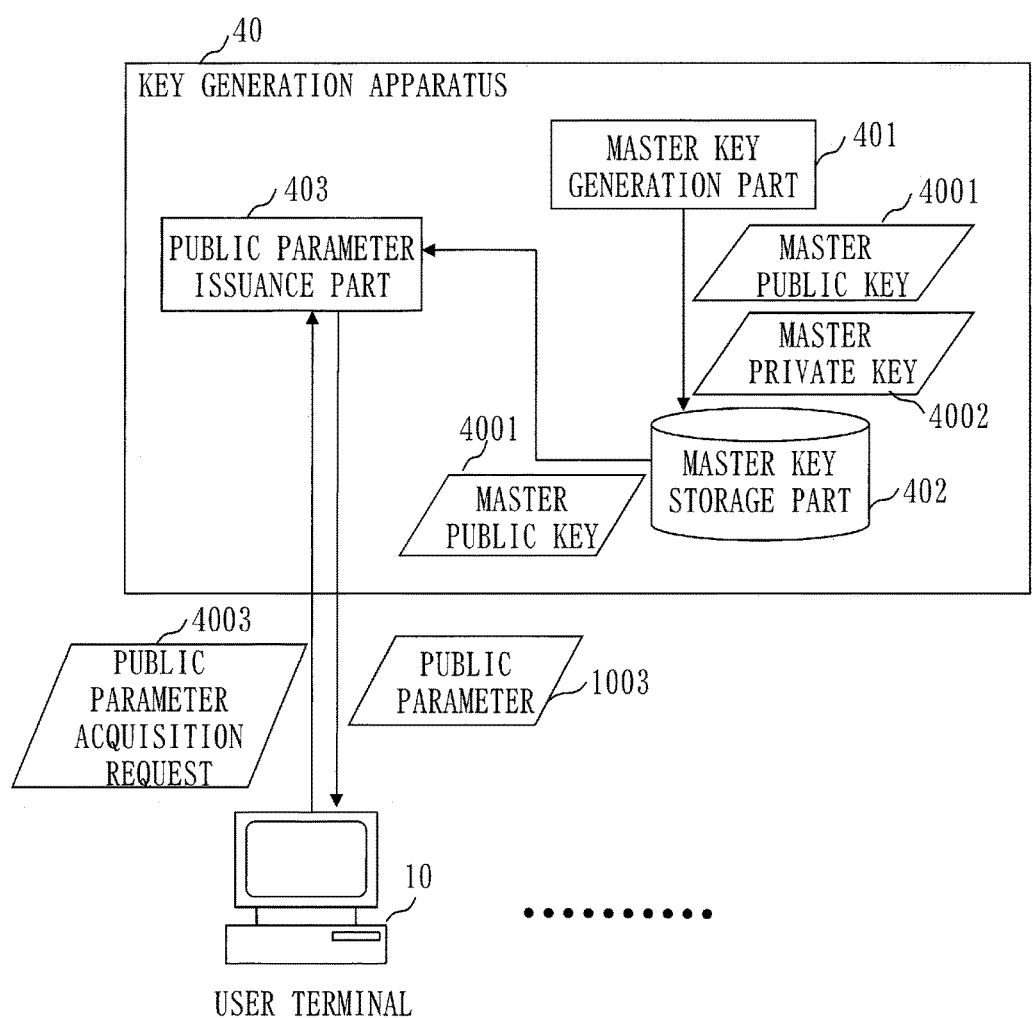
FIG. 6 is a functional block diagram illustrating a function of a key generation apparatus 40 related to the first embodiment.

FIG. 6 is a functional block diagram illustrating a function of a process to generate the public parameter by the key generation apparatus 40 related to the first embodiment. FIG. 7 is a functional block diagram illustrating a function of a process to generate the decryption key of the key generation apparatus 40 and the user information management apparatus 50 related to the first embodiment.

The key generation apparatus 40 includes a master key generation part 401, a master key storage part 402, a public parameter issuance part 403, a user authentication part 404, a user attribute acquisition part 405, and a decryption key generation part 406.

The user information management apparatus 50 includes an attribute information storage part 501 and a user attribute retrieval part 502.

A master public key 4001 and a master private key 4002 are first generated and maintained by the key generation apparatus 40 (at the time of the initial setting and the like when the file storage system 1 is introduced). Normally, only one pair of the master public key 4001 and the master private key 4002 is generated for the file storage system 1. The master public key 4001 is public information. Since the master private key 4002 is information by which all the decryption keys 1007 can be generated, the master private key 4002 is stored in secrecy by the key generation apparatus 40.

A public parameter acquisition request 4003 is request data which is issued by the user terminal 10 to acquire the public parameter 1003. The public parameter acquisition request 4003 may be, for instance, a public parameter acquisition URL (Uniform Resource Locator) indicating a site from which the public parameter 1003 is acquired, if HTTP (Hypertext Transfer Protocol) is used for communication between the user terminal 10 and the key generation apparatus 40.

A user ID 4004 is information by which a user can be uniquely identified. The user ID 4004 is, for instance, an employee number or an e-mail address.

The master key generation part 401 generates a pair of the master public key 4001 and the master private key 4002 (referred to as a master key pair, hereinafter).

The master key storage part 402 stores the master key pair generated by the master key generation part 401.

The public parameter issuance part 403 generates the public parameter 1003 by putting an electronic signature on the master public key 4001 by the key generation apparatus 40. The public parameter issuance part 403 releases the public parameter 1003 using means such as WEB, mail transmission, distribution of data recording medium, and the like.

The user authentication part 404 authenticates the user ID 4004 received from the user terminal 10. The user authentication part 404 may authenticate using, for instance, an electronic certificate or a password.

The user attribute acquisition part 405 acquires the user attribute 1005 from the user information management apparatus 50 using the user ID 4004 as a key.

The decryption key generation part 406 generates the decryption key 1007 using the master private key 4002 and the user attribute 1005.

The attribute information storage part 501 stores the attribute information (for instance, a name, an age, a sex, a department to which the user belongs, a division to which the user belongs, an official position, and the like) of the user. The attribute information of the user is managed by an organization such as company and the like; it is assumed that the user attribute 1005 of the all users is previously stored.

The user attribute retrieval part 502 retrieves the user attribute 1005 from the attribute information storage part 501 using the user ID 4004 as a key.

The operation of the file storage system 1 related to the first embodiment will be explained.

First, after explaining the user attribute 1005 and the information of the user which are assumed here, the operation of the file storage system 1 will be explained. The operation of the file storage system 1 is divided into a distribution process of the public parameter and the decryption key, a folder generation process, an encryption process, and a decryption process.

FIG. 8 is a list of attribute types and attribute values to be used for expressing the user attribute 1005 assumed in the first embodiment.

The user attribute 1005 is expressed by a format of "attribute type=attribute value"; and a plurality of attributes can be included, for instance, "department=accounting department, division=budget division".

FIG. 9 is a list of users assumed in the first embodiment.

User attribute is assigned to each user. In a case where there is no corresponding attribute, NULL symbol is the attribute value. It is assumed that these pieces of information are previously stored in the user information management apparatus 50.

<Distribution Process of Public Parameter and Decryption Key>

The distribution process of the public parameter and the decryption key is a process to distribute the public parameter 1003 and the decryption key 1007 to the user terminal 10.

The distribution process of the public parameter and the decryption key may be executed at the time of initial setting and the like when the file storage system 1 is introduced; or it may be executed when the public parameter 1003 and the decryption key 1007 become necessary during the encryption process and the decryption process.

As discussed above, the file storage system 1 uses the functional encryption. In the functional encryption, the master key pair is generated first. Next, the decryption key 1007 (in the functional encryption, this is referred to as a user private key) is generated from the user attribute 1005 and the master private key 4002.

Note that one pair of the master key pair is used for each file storage system 1. The master key pairs of a plurality of file storage systems 1 may be generated by one key generation apparatus 40. In this case, the key generation apparatus 40 associates the file storage system 1 with the master key pair.

Figure 10:
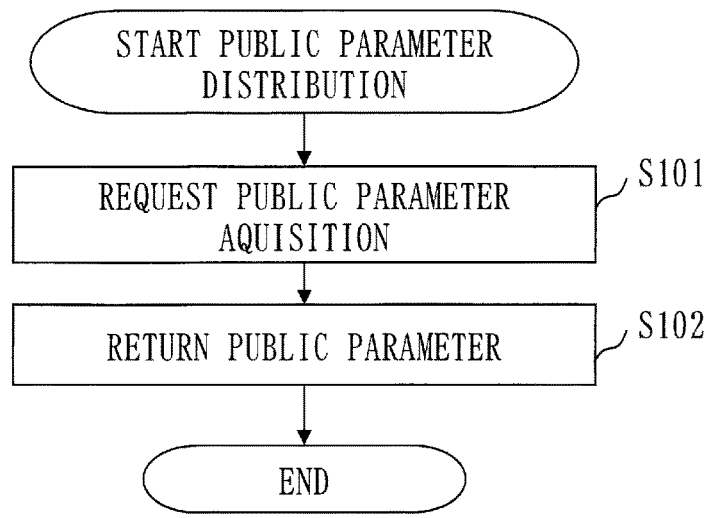
FIG. 10 is a flowchart illustrating a distribution process of a public parameter 1003 related to the first embodiment.

FIG. 10 is a flowchart illustrating the distribution process of the public parameter 1003 related to the first embodiment.

(S101)

The user terminal 10 transmits the public parameter acquisition request 4003 to the public parameter issuance part 403 of the key generation apparatus 40.

(S102)

The public parameter issuance part 403 of the key generation apparatus 40 extracts from the master key storage part 402 the master public key 4001 corresponding to the public parameter acquisition request 4003 received from the user terminal 10. Then, the public parameter issuance part 403 puts an electronic signature on the extracted master public key 4001 to generate the public parameter 1003 and returns the public parameter 1003 to the user terminal 10.

This sequence of actions becomes the operation in which, in case of, for instance, using HTTP, when the user terminal 10 accesses the public parameter acquisition URL, the public parameter 1003 is downloaded to the user terminal 10.

Figure 11:
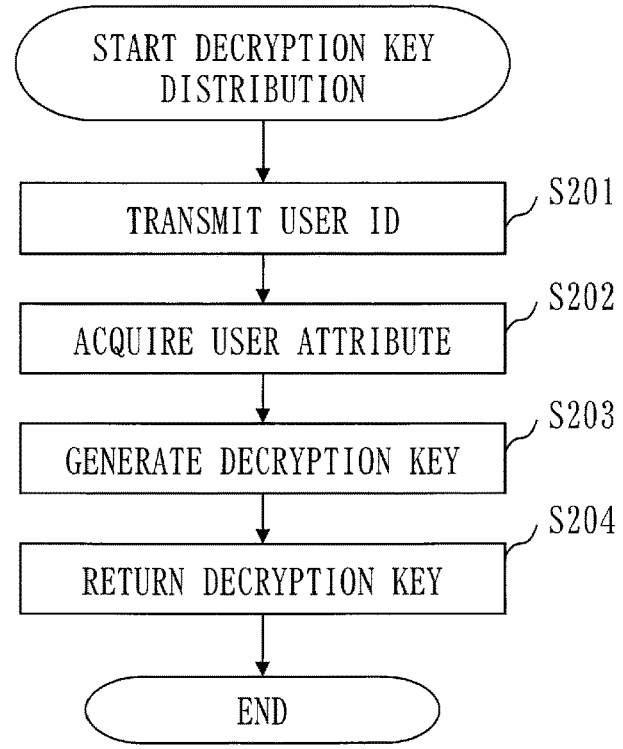
FIG. 11 is a flowchart illustrating a distribution process of a decryption key 1007 related to the first embodiment.

FIG. 11 is a flowchart illustrating the distribution process of the decryption key 1007 related to the first embodiment.

(S201)

The user terminal 10 transmits the user ID 4004 to the key generation apparatus 40. Then, the user authentication part 404 of the key generation apparatus 40 receives the user ID 4004 and checks whether or not the user who transmitted the user ID 4004 is the user himself. If it is confirmed to be the user himself, the user authentication part 404 transfers the user ID 4004 to the user attribute acquisition part 405.

(S202)

The user attribute acquisition part 405 of the key generation apparatus 40 transmits the user ID 4004 to the user attribute retrieval part 502 of the user information management apparatus 50. The user attribute retrieval part 502 retrieves the user attribute 1005 corresponding to the user ID 4004 from the attribute information storage part 501 using the received user ID 4004 as a key, and returns the retrieved user attribute 1005 to the user attribute acquisition part 405 of the key generation apparatus 40. Then, the user attribute acquisition part 405 transfers the user attribute 1005 acquired from the user information management apparatus 50 to the decryption key generation part 406.

Figures 12, 13:
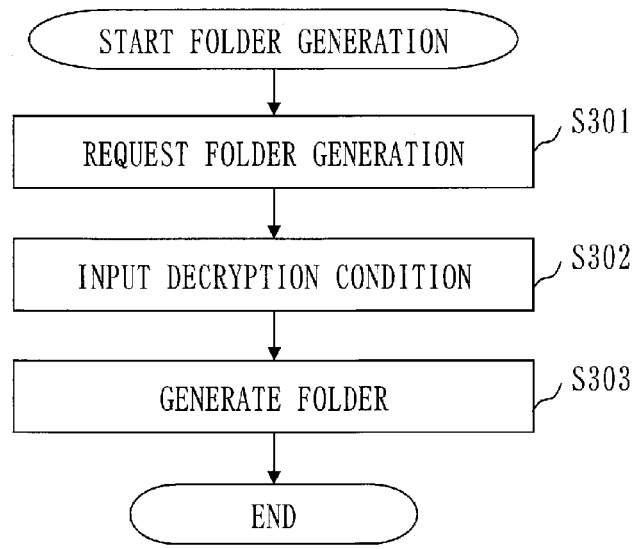
FIG. 12 is a diagram illustrating an example of information stored in an attribute information storage part 501 related to the first embodiment.
FIG. 13 is a flowchart illustrating a folder generation process related to the first embodiment.

For instance, it is assumed that the attribute information storage part 501 stores information illustrated in FIG. 12. If the user attribute retrieval part 502 receives "KS1001" as the user ID 4004 from the key generation apparatus 40, the user attribute retrieval part 502 returns the user attribute 1005 which is "name=Kenichi SUZUKI, department=accounting department, division=NULL, official position=department manager".

(S203)

The decryption key generation part 406 generates the decryption key 1007 from the user attribute 1005 acquired from the user information management apparatus 50 and the master private key 4002 stored in the master key storage part 402.

(S204)

The decryption key generation part 406 of the key generation apparatus 40 returns the generated decryption key 1007 to the user terminal 10.

<Folder Generation Process>

The folder generation process is a process to generate a folder to be used for generating the encrypted file 1004 by the user terminal 10.

The folder generation process is carried out at the time of generating the encrypted file 1004. If the folder to be generated already exists, there is no need to generate the same folder.

FIG. 13 is a flowchart illustrating the folder generation process related to the first embodiment.

(S301)

The file list display part 101 of the user terminal 10 executes a command to generate a new folder in accordance with the instruction of the user.

(S302)

The file list display part 101 of the user terminal 10 inputs, according to the instruction of the user, the decryption condition 1002 to be set as a folder name of the folder to be newly generated. As discussed above, the decryption condition 1002 is configured by an attribute type, an attribute value, a logical operator (for instance, AND/OR/NOT), and parentheses (these indicate operation with priority). The decryption condition 1002 is described, for instance, if it is desired to be decrypted by an administrative position (department manager, division manager) of accounting department, as "department=accounting department AND (official position=department manager OR official position=division manager)".

(S303)

The file list display part 101 of the user terminal 10 generates a folder having the folder name which is the received decryption condition 1002.

<Encryption Process>

The encryption process is a process to encrypt the file 1001 to generate the encrypted file 1004, and store the encrypted file 1004 in the file storage apparatus 20.

Figure 14:
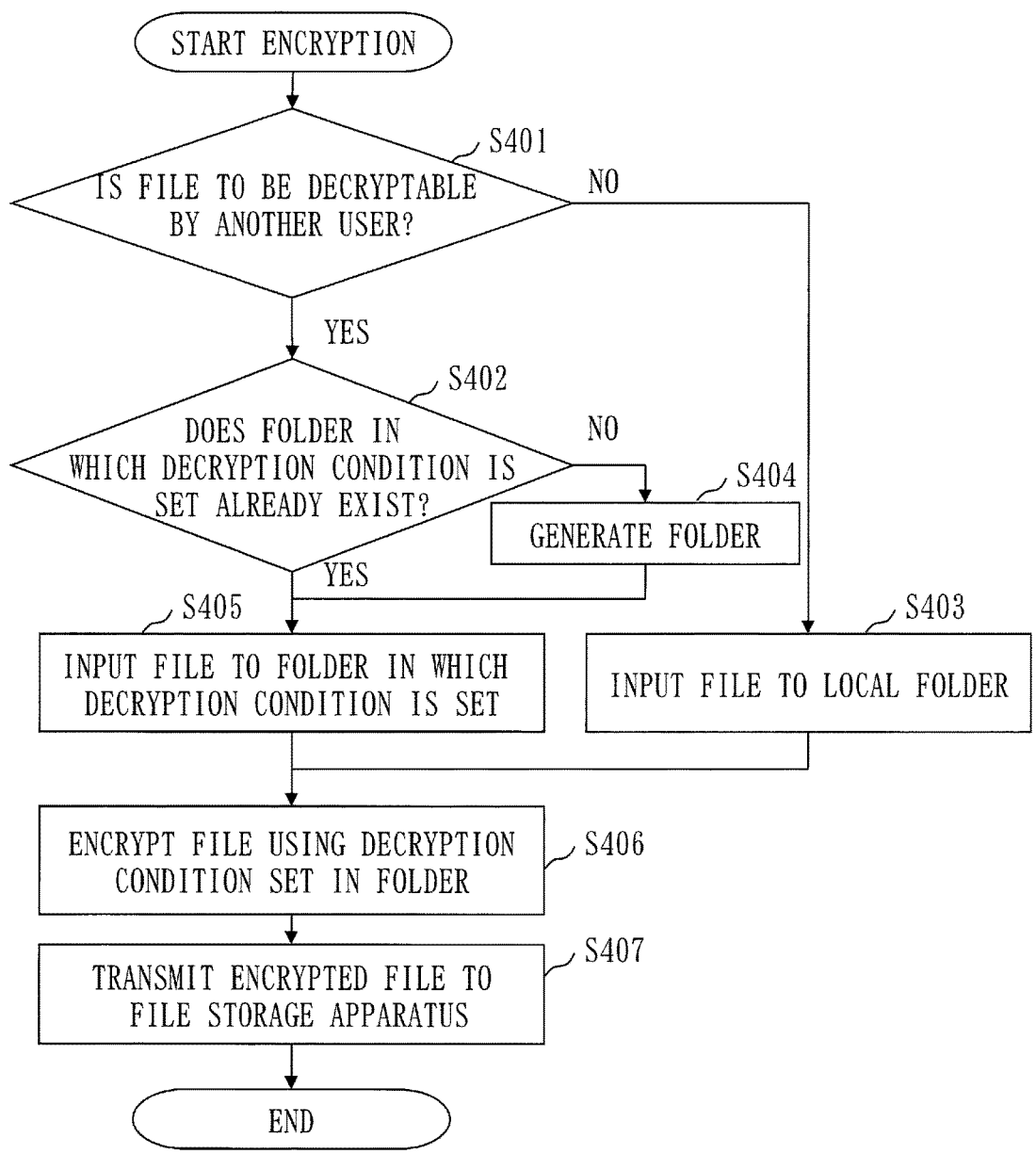
FIG. 14 is a flowchart illustrating an encryption process related to the first embodiment.

FIG. 14 is a flowchart illustrating the encryption process related to the first embodiment.

(S401)

The user decides how to encrypt the file 1001 of encryption target so that whether it can be decrypted only by the user himself or also by another user. In the former case, the process proceeds to S403; and in the latter case, the process proceeds to S402.

(S402)

The process of the file list display part 101 of the user terminal 10 proceeds, if the folder to which the decryption condition 1002 desired by the user is set is displayed, to S405; and if not displayed, the process proceeds to S404.

(S403)

The file list display part 101 of the user terminal 10 inputs, according to the instruction of the user, the file 1001 of encryption target to a predetermined local folder (the folder to which the user attribute 1005 of the user himself is set as the decryption condition 1002). The user, for instance, drags and drops the file 1001 of encryption target to the predetermined local folder, and thereby the user specifies the encryption of the file 1001 of encryption target so that the encrypted file can be decrypted only by the user himself.

(S404)

The file list display part 101 of the user terminal 10 newly generates a folder to which the decryption condition 1002 desired by the user is set. The generation of the folder is carried out by the process illustrated in FIG. 13. After generation of the folder, the process of the file list display part 101 of the user terminal 10 proceeds to the step S405.

(S405)

The file list display part 101 of the user terminal 10 inputs, according to the instruction of the user, the file 1001 of encryption target to the folder to which the desired decryption condition 1002 is set. The user, for instance, drags and drops the file 1001 of encryption target to the folder to which the desired decryption condition 1002 is set, and thereby the desired decryption condition 1002 and the file 1001 of encryption target are specified.

(S406)

The encryption part 102 of the user terminal 10 encrypts the file 1001 to generate the encrypted file 1004 using the received file 1001, the decryption condition 1002 set in the received folder, and the public parameter 1003 stored in the key storage part 103 so as to be decryptable by the user indicated by the decryption condition 1002.

(S407)

The encrypted data transmission part 104 of the user terminal 10 transmits the encrypted file 1004 to the file storage apparatus 20.

The encrypted data reception part 201 of the file storage apparatus 20 receives the encrypted file 1004, and transfers the received encrypted file 1004 to the encrypted file storage part 202. The encrypted file storage part 202 stores the encrypted file 1004.

<Decryption Process>

The decryption process is a process to acquire the encrypted file 1004 stored in the file storage apparatus 20, decrypt the acquired encrypted file 1004, and generate the file 1001.

FIG. 15 is a flowchart illustrating the decryption process related to the first embodiment.

(S501)

The file list request part 105 of the user terminal 10 extracts the user attribute 1005 from the key storage part 103 and transmits the user attribute 1005 to the file storage apparatus 20.

(S502)

The file list request reception part 203 of the file storage apparatus 20 receives the user attribute 1005 from the user terminal 10, and transfers the received user attribute 1005 to the file list generation part 205.

The file list generation part 205 extracts the decryption condition 1002 stored in the header part 1004a of the encrypted file 1004 stored in the encrypted file storage part 202. The file list generation part 205 transfers the user attribute 1005 and the decryption condition 1002 to the decryptability determination part 204. The decryptability determination part 204 determines whether the received user attribute 1005 matches the decryption condition 1002; and returns the determination result 2001 indicating "decryptable" if matched, and the determination result 2001 indicating "undecryptable" if not matched, to the file list generation part 205.

The file list generation part 205 carries out decryptability determination for all the encrypted files 1004 stored in the encrypted file storage part 202, and returns a group of decryptable encrypted files 1004 to the user terminal 10 as the file list 1006.

The file list 1006 includes, for instance, in case of the user "Kenichi SUZUKI" (name=Kenichi SUZUKI, department=accounting department, division=NULL, official position=department manager) shown in FIG. 9, the contents as illustrated in FIG. 16.

(S503)

The file list reception part 106 of the user terminal 10 receives the file list 1006 from the file storage apparatus 20, and transfers the received file list 1006 to the file list display part 101. The file list display part 101 displays using folders the identifying information such as the file name and the like of the encrypted file 1004 included in the received file list 1006.

The file list display part 101 displays, for instance, in case of the file list 1006 as illustrated in FIG. 16, the file list 1006 as illustrated in FIG. 17.

(S504)

The file list display part 101 transfers, according to the instruction of the user, the encrypted file 1004, which is desired to be decrypted, from among the displayed encrypted files 1004 to the decryption part 107. The user, for instance, drags and drops the encrypted file 1004 to be decrypted out of the folder, and thereby the encrypted file 1004 to be decrypted is transferred to the decryption part 107.

(S505)

The decryption part 107 extracts the decryption key 1007 from the key storage part 103, and decrypts the encrypted file 1004 transferred from the file list display part 101 using the decryption key 1007. After the decryption succeeds, the file 1001 is acquired, and the decryption part 107 stores the acquired file 1001 in the predetermined place (for instance, the place where the encrypted file 1004 has been dropped).

As discussed above, for instance, the drag and drop operation of the file 1001 to the folder can encrypt the file 1001. Similarly, for instance, by the drag and drop operation of the encrypted file 1004 out of the folder, the encrypted file 1004 can be decrypted.

In the file storage system 1 related to the first embodiment, the file 1001 is encrypted using the encryption scheme having the access control function. That is, in the file storage system 1 related to the first embodiment, the access control function is embedded in the encrypted file 1004. Therefore, at the time of distributing the decryption key 1007 at first, the user authentication is certainly carried out, and thereby the user authentication becomes unnecessary at the subsequent encryption process or decryption process. And thus, in the operation, the authentication server becomes unnecessary, so that the operation cost can be reduced.

Further, since the file 1001 is encrypted by the encryption scheme having the access control function, there is no need to prepare the decryption key for each file for each user who is desired to decrypt; and therefore the management load of the decryption key can be reduced.

Further, in the file storage system 1 related to the first embodiment, the decryptable encrypted file 1004 is specified from the decryption condition 1002 stored in the header part 1004a of the encrypted file 1004 and the user attribute 1005, and the specified encrypted file 1004 is displayed using a folder having the decryption condition 1002 as a folder name. And thus, the file storage apparatus 20 does not need to store the encrypted files 1004 with separating into folders, so that the operational load of the folder management of the encrypted files 1004 can be reduced in the file storage apparatus 20.

Further, in the file storage system 1 related to the first embodiment, the file 1001 is dragged and dropped to the folder to which the user sets the access right (decryption condition 1002), and the file 1001 is encrypted by the encryption scheme using the access right information as an input parameter. By this operation, the access control can be carried out in a user-driven manner.

In the decryption process (S501 in FIG. 15), the user ID 4004 which is transmitted from the user terminal 10 to the file storage apparatus 20 might be fabricated. However, even if the user ID 4004 which is transmitted from the user terminal 10 to the file storage apparatus 20 is fabricated, the encrypted file 1004 which does not match the decryption condition 1002 is merely acquired. That is, the encrypted file 1004 encrypted by the functional encryption cannot be decrypted by the decryption key 1007 of the user who fabricates the user ID 4004. Therefore, the access right can be linked to the encrypted file 1004 by combining with the functional encryption, and thereby the secure file storage system 1 can be configured.

Further, in the above explanation, in the decryption process, the file storage apparatus 20 transmits a group of encrypted files 1004 which satisfy the decryption condition 1002 to the user terminal 10 as the file list 1006.

However, in the file storage apparatus 20, instead of the group of encrypted files 1004 which satisfy the decryption condition 1002, pieces of identifying information such as file names and the like of the encrypted files 1004 which satisfy the decryption condition 1002 may be transmitted to the user terminal 10 as the file list 1006. In this case, the user terminal 10 once displays the file list 1006, and when the encrypted file 1004 which is desired to be decrypted is selected, the user terminal 10 transmits the identifying information of the selected encrypted file 1004 to the file storage apparatus 20. Then, the file storage apparatus 20 transmits the encrypted file 1004 indicated by the transmitted identifying information to the user terminal 10.

In a case where the group of encrypted files 1004 is transmitted as the file list 1006, if there are many encrypted files 1004 which satisfy the decryption condition 1002, the data amount to be transmitted from the file storage apparatus 20 to the user terminal 10 becomes large, and thus the network 30 is heavily loaded. However, if the pieces of identifying information are transmitted as the file list 1006, the data amount to be transmitted from the file storage apparatus 20 to the user terminal 10 does not become large, and the network 30 is not loaded.

Further, in the above explanation, in the file storage apparatus 20, the decryptability determination part 204 carries out the decryptability determination, and thereby only the encrypted files 1004 which are decryptable by the user linked to the user terminal 10 are returned to the user terminal 10.

However, the file storage apparatus 20 does not always need to perform the decryptability determination. That is, when the user terminal 10 requests the file list 1006, the file storage apparatus 20 does not carry out the decryptability determination, but may return all the encrypted files 1004 to the user terminal 10. Then, the file list display part 101 of the user terminal 10 actually carries out the decryption, and the file list display part 101 may display only the encrypted files 1004 which have been successfully decrypted.

Further, in the above explanation, the encrypted file storage part 202 of the file storage apparatus 20 may store the encrypted files 1004 without separating into folders.

In practice, however, there may be a case where the encrypted files 1004 should be preferably separated into folders to some extent. Then, the encrypted file storage part 202 of the file storage apparatus 20 may separate the files into groups and store the separated files in folders based on the decryption condition 1002 of the encrypted files 1004. In this case, the decryptability determination part 204, when carrying out the decryptability determination based on the user attribute 1005 and the decryption condition 1002, may perform decryptability determination only once for a group having the same decryption condition 1002 (that is, the encrypted files 1004 in the same folder). By this operation, the decryptability determination can be carried out efficiently.

Further, in the above explanation, the encryption method and the decryption method of the file 1001 to be stored in the computer has been discussed. Here, the file 1001 merely means electronic data, and can be read as simply data. That is, the above file storage system 1 can be applied to a data storage form having two kinds of information of electronic data and access right. For instance, the file storage system 1 can be applied to the database system.

Figure 18:
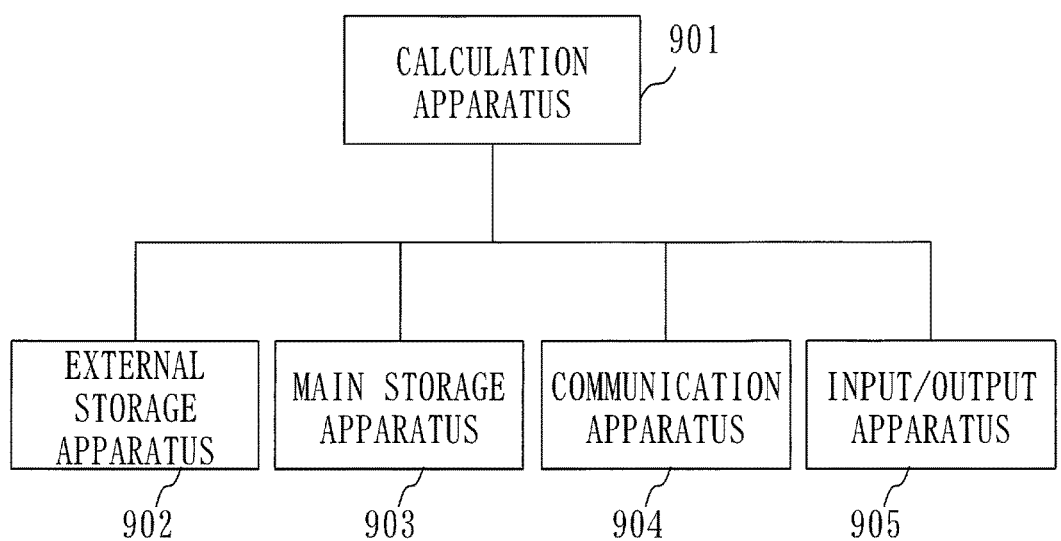
FIG. 18 is a diagram illustrating a hardware configuration example of a user terminal 10, a file storage apparatus 20, a key generation apparatus 40, a user information management apparatus 50 described in the first embodiment.

FIG. 18 is a diagram illustrating an example of a hardware configuration of the user terminal 10, the file storage apparatus 20, the key generation apparatus 40, and the user information management apparatus 50 described in the first embodiment.

The user terminal 10 is a computer such as a desktop PC, a notebook PC, a smartphone, a tablet terminal, and the like. The file storage apparatus 20 is a computer such as a file server and the like. The key generation apparatus 40 and the user information management apparatus 50 are computers such as an application server, a database server, and the like. Each component of the user terminal 10, the file storage apparatus 20, the key generation apparatus 40, the user information management apparatus 50 can be implemented by programs.

As a hardware configuration of the user terminal 10, the file storage apparatus 20, the key generation apparatus 40, and the user information management apparatus 50, a calculation apparatus 901, an external memory apparatus 902, a main memory apparatus 903, a communication apparatus 904, an input/output apparatus 905 are connected to a bus.

The calculation apparatus 901 is a CPU (Central Processing Unit) and the like to execute programs. The external memory apparatus 902 is, for instance, a ROM (Read Only Memory), a flash memory, a hard disk drive, and the like. The main memory apparatus 903 is, for instance, a RAM (Random Access Memory), and the like. The communication apparatus 904 is, for instance, a communication board, and the like. The input/output apparatus 905 is, for instance, a mouse, a keyboard, a display device, and the like.

The programs are usually stored in the external memory apparatus 902; in a way of being loaded to the main memory apparatus 903, the programs are sequentially read and executed by the calculation apparatus 901.

The programs are to implement the functions that have been explained as the file list display part 101, the encryption part 102, the key storage part 103, the encrypted data transmission part 104, the file list request part 105, the file list reception part 106, the decryption part 107, the encrypted data reception part 201, the encrypted file storage part 202, the file list request reception part 203, the decryptability determination part 204, the file list generation part 205, the master key generation part 401, the master key storage part 402, the public parameter issuance part 403, the user authentication part 404, the user attribute acquisition part 405, the decryption key generation part 406, the attribute information storage part 501, and the user attribute retrieval part 502.

In addition, the external memory apparatus 902 also stores an operating system (OS), at least a part of the OS is loaded to the main memory apparatus 903, and the calculation apparatus 901, while executing the OS, executes the above programs.

Further, in the explanation of the first embodiment, information, data, signal values, or variable values that have been explained as the file 1001, the decryption condition 1002, the public parameter 1003, the encrypted file 1004, the user attribute 1005, the file list 1006, the decryption key 1007, the determination result 2001, the master public key 4001, the master private key 4002, the public parameter acquisition request 4003, the user ID 4004, and the like are stored in the main memory apparatus 903 as the files.

Here, the configuration of FIG. 18 merely illustrates one example of the hardware configuration of the user terminal 10, the file storage apparatus 20, the key generation apparatus 40, and the user information management apparatus 50; the hardware configuration of the user terminal 10, the file storage apparatus 20, the key generation apparatus 40, and the user information management apparatus 50 is not limited to the configuration illustrated in FIG. 18, but may be another configuration.

REFERENCE SIGNS LIST

1: file storage system; 10: user terminal; 20: file storage apparatus; 30: network; 40: key generation apparatus; 50: user information management apparatus; 101: file list display part; 102: encryption part; 103: key storage part; 104: encrypted data transmission part; 105: file list request part; 106: file list reception part; 107: decryption part; 201: encrypted data reception part; 202: encrypted file storage part; 203: file list request reception part; 204: decryptability determination part; 205: file list generation part; 401: master key generation part; 402: master key storage part; 403: public parameter generation part; 404: user authentication part; 405: user attribute acquisition part; 406: decryption key generation part; 501: attribute information storage part; 502: user attribute retrieval part; 1001: file; 1002: decryption condition; 1021: encrypted data; 1003: public parameter; 1004: encrypted file; 1004a: header part; 1004b: data part; 1005: user attribute; 1006: file list; 1007: decryption key; 2001: determination result; 4001: master public key; 4002: master private key; 4003: public parameter acquisition request; and 4004: user ID.

The invention claimed is:

1. A file storage system comprising:
a file storage apparatus to store a ciphertext which can be decrypted when attribute information satisfies a decryption condition of a logical expression; and
a user terminal to display a folder having the decryption condition set forth in the folder and also as a folder name, and to automatically encrypt using the decryption condition a file to be encrypted input to the folder by a drag and drop operation of a user,
wherein the user terminal comprises processing circuitry:
to transmit the attribute information to the file storage apparatus, wherein the file storage apparatus comprises processing circuitry:
  to store ciphertexts;
  to extract identifying information of a ciphertext of which a decryption condition is satisfied by the attribute information transmitted from among the ciphertexts stored; and
  to transmit a list indicating identifying information of the ciphertext extracted to the user terminal, and
wherein the processing circuitry of the user terminal displays the identifying information, indicated by the list transmitted, classified by decryption condition.

2. The file storage system of claim 1, wherein the user terminal displays an encrypted file on the folder, and decrypts the encrypted file that is moved out of the folder by the drag and drop operation of the user using a decryption key to which attribute information of the user is embedded.

3. The file storage system of claim 1,
  wherein the processing circuitry of the file storage apparatus stores the ciphertexts together with information indicating a decryption condition of the ciphertext, and
  wherein the processing circuitry of the file storage apparatus extracts, based on the information indicating the decryption condition, identifying information of a ciphertext of which the decryption condition is satisfied by the attribute information from among the ciphertexts stored.

4. The file storage system of claim 1, wherein the processing circuitry of the file storage apparatus transmits a list indicating the identifying information classified by decryption condition.

5. The file storage system of claim 1, wherein the processing circuitry of the file storage apparatus transmits a list indicating a decryption condition of the ciphertext for each identifying information, and
  wherein the processing circuitry of the user terminal displays the identifying information together with the decryption condition.

6. The file storage system of claim 1, wherein the processing circuitry of the file storage apparatus stores the ciphertext classified by decryption condition.

7. The file storage system of claim 1, wherein the file storage system uses a functional encryption for an encryption scheme.

8. A user terminal that displays a folder having a decryption condition of a logical expression set in the folder and also as a folder name in which a ciphertext can be decrypted when attribute information satisfies the decryption condition, and automatically encrypts using the decryption condition a file to be encrypted input to the folder by a drag and drop operation of a user,
  wherein the user terminal accesses a file storage apparatus to store a ciphertext of data encrypted by an encryption scheme in which a ciphertext can be decrypted using a decryption key when attribute information set in the decryption key satisfies a decryption condition set in the ciphertext,
  the user terminal comprising processing circuitry:
    to transmit the attribute information to the file storage apparatus;
    to receive, from the file storage apparatus, a list indicating identifying information of the ciphertext of which the decryption condition is satisfied by the attribute information transmitted from among the ciphertexts stored by the file storage apparatus; and
    to display the identifying information, indicated by the list received, classified by decryption condition.

9. The user terminal of claim 8, wherein the user terminal displays an encrypted file on the folder, and decrypts the encrypted file that is moved out of the folder by the drag and drop operation of the user using a decryption key to which attribute information of the user is embedded.

10. The user terminal of claim 8, wherein the user terminal uses a functional encryption for an encryption scheme.

* * * * *